(12) United States Patent
Jenkins et al.

(10) Patent No.: US 8,239,313 B2
(45) Date of Patent: Aug. 7, 2012

(54) SYSTEM AND METHOD FOR THE INTERACTIVE TRADING OF DERIVATIVES

(75) Inventors: Jack Jenkins, Kingwood, TX (US); John Berkley, Chicago, IL (US); David M. Lee, Glendale, AZ (US); Cheryl Cramer, New York, NY (US); Ethan Laub, New York, NY (US); Robert Pacheco, Montrose, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 1604 days.

(21) Appl. No.: 10/211,928

(22) Filed: Aug. 2, 2002

(65) Prior Publication Data
US 2003/0028476 A1 Feb. 6, 2003

Related U.S. Application Data

(60) Provisional application No. 60/309,561, filed on Aug. 2, 2001.

(51) Int. Cl.
*G06Q 40/00* (2012.01)
(52) U.S. Cl. ......................................................... 705/37
(58) Field of Classification Search .................... 705/26, 705/27, 36 R, 37
See application file for complete search history.

(56) References Cited

U.S. PATENT DOCUMENTS

| | | | |
|---|---|---|---|
| 4,823,265 A | 4/1989 | Nelson et al. | |
| 4,885,685 A | 12/1989 | Wolfberg et al. | |
| 4,903,201 A * | 2/1990 | Wagner | 705/37 |
| 5,253,165 A | 10/1993 | Leiseca et al. | |
| 5,297,031 A | 3/1994 | Gutterman et al. | |
| 5,642,279 A | 6/1997 | Bloomberg et al. | |
| 5,794,207 A * | 8/1998 | Walker et al. | 705/1 |
| 5,797,127 A * | 8/1998 | Walker et al. | 705/5 |
| 5,806,048 A * | 9/1998 | Kiron et al. | 705/36 R |
| 5,852,808 A | 12/1998 | Cherny | |
| 5,884,274 A | 3/1999 | Walker et al. | |
| 5,897,620 A | 4/1999 | Walker et al. | |
| 6,023,679 A | 2/2000 | Acebo et al. | |
| 6,023,685 A | 2/2000 | Brett et al. | |
| 6,041,308 A | 3/2000 | Walker et al. | |
| 6,067,532 A | 5/2000 | Gebb | |
| 6,098,051 A | 8/2000 | Lupien et al. | |
| 6,101,484 A | 8/2000 | Halbert et al. | |
| 6,107,932 A | 8/2000 | Walker et al. | |
| 6,112,185 A | 8/2000 | Walker et al. | |
| 6,134,534 A | 10/2000 | Walker et al. | |

(Continued)

OTHER PUBLICATIONS

Rothstein, Marvin. "OR and the Airline Overbooking Problem." Operations Research. vol. 33, No. 2 (1985):237-247.*

(Continued)

*Primary Examiner* — Jason M Borlinghaus
(74) *Attorney, Agent, or Firm* — Snell & Wilmer L.L.P.

(57) ABSTRACT

A method and system of trading derivatives of various items includes an electronic marketplace configured to accept requests to purchase derivatives and requests to sell derivatives. The marketplace is configured to match requests to purchase with requests to sell when certain criteria are similar to within predetermined limits. Available derivatives include futures contracts, put options, and call options. The derivatives allow one to purchase rights in an item prior to the actual delivery of the item. In addition, the derivatives may be traded to other parties. The use of such derivatives also enables entities to negotiate the prices for various goods and services that were previously not readily negotiable in the past.

8 Claims, 4 Drawing Sheets

U.S. PATENT DOCUMENTS

| | | | |
|---|---|---|---|
| 6,157,918 | A | 12/2000 | Shepherd |
| 6,240,396 | B1 | 5/2001 | Walker et al. |
| 6,408,282 | B1 * | 6/2002 | Buist .......................... 705/36 R |
| 6,618,707 | B1 * | 9/2003 | Gary .......................... 705/36 R |
| 7,440,918 | B2 | 10/2008 | Boyle et al. |
| 2001/0049649 | A1 * | 12/2001 | Baecker et al. ................ 705/37 |
| 2001/0049651 | A1 * | 12/2001 | Selleck .......................... 705/37 |
| 2002/0082978 | A1 * | 6/2002 | Ghouri et al. .................. 705/37 |

OTHER PUBLICATIONS

PCT; International Search Report dated Jun. 17, 2003 in Application No. PCT/2002/024560.

PCT; International Preliminary Report on Patentability dated Jul. 9, 2005 in Application No. PCT/2002/024560.

* cited by examiner

SYSTEM AND METHOD FOR THE INTERACTIVE TRADING OF DERIVATIVES

CROSS-REFERENCE TO RELATED APPLICATIONS

This application claims priority from U.S. Provisional Application serial No. 60/309,561, filed Aug. 2, 2001.

FIELD OF INVENTION

This application relates generally to the sale of goods and services and more particularly to a method and system for selling and trading derivatives of goods and services.

BACKGROUND OF THE INVENTION

There is a desire for entities to stabilize their costs or to determine their future costs in advance. In the past, negotiated rates were sometimes used by buyers to reduce future costs. In some instances, negotiated rates involved an agreement that states that if the buyer purchases a specified amount of goods or services before a specified time, the buyer will receive a predetermined discount from the prevailing fair market value for the goods or services desired. However, a disadvantage of certain types of negotiated rates is that the buyer may not be given specific information as to the exact cost of the product or service being purchased until the time for payment for the product or service has arrived, because only a percentage discount may be known at the time of negotiation; the knowledge that one would receive a 25% discount is useful, but the cost may still be uncertain, as it may be unknown from what price the 25% discount is taken.

A derivative is an item that derives its value from another, more fundamental item. An example of a derivative is a promise or contract to buy a product or service at a set price at a certain time in the future. Derivatives and the exchange of derivatives through an automated exchange provides an opportunity for both the supplier and the buyer to hedge against the risks associated with volatility in the various markets. For example, the events of Sep. 11, 2001 led to a downturn in various aspects of the travel industry. Had an exchange that traded a significant volume of travel derivative products existed at that time, it is possible that the economic impact could have been lessened to a certain degree. There would have been guaranteed revenues for suppliers in the market due to then-existing futures contracts. In addition, there may have been speculation in the derivatives market that may have generated revenues through the buying and trading of options as prices dropped. Such speculation may result in trading, possibly resulting in a more stable economic situation.

Thus, it is desirable to provide a method and system to allow entities to obtain more competitive pricing for various goods and services though the use of derivatives.

SUMMARY OF THE INVENTION

A method and system of the present invention addresses many of the shortcomings of the prior art. In accordance with one aspect of the present invention, a computer-implemented method of trading an item is provided.

In accordance with an embodiment of the present invention, a computer-implemented method of the present invention involves creating a derivative of an item to be sold. The item to be sold may be a good or a service. The derivative is placed on a virtual marketplace. In the virtual marketplace, the derivative can be matched with requests to purchase that match various similarity criteria. In an embodiment of the present invention the derivatives in question may comprise a futures contract, a put option, or a call option. Once a match has been made, the orders can be matched through the use of a computer-implemented clearinghouse. In accordance with an embodiment of the present invention, a computer-implemented method of conducting an auction may be provided. The method may include the step of making a request on a marketplace for a particular good or service. The request may include a variety of data. A derivative can then be created that represents the provision of the particular goods or services. The derivative may be either a put option, a call option, and or a futures contract.

In accordance with another embodiment of the present invention, a method for the trading of derivatives is presented. The method may include making the derivative available for trading on a computer-implemented marketplace. Requests to purchase derivatives are placed on the marketplace and matched with options on the marketplace. Once a match has been made, the entity requesting the purchase owns a derivative indicative of various goods or services.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and the leftmost digit of a reference number identifies the drawing in which the reference number appears:

DETAILED DESCRIPTION

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components within various exemplary circuits, such connections and couplings may be realized by a direct connection between components, or by a connection through other components and devices.

In an embodiment of the present invention, various derivatives of products may be purchased and traded in an electronic marketplace. The derivatives may be contracts that can be used to purchase goods or services for use at a predetermined time in the future. Available derivatives may include futures, call options, and put options.

The use of derivatives may enable both buyers and sellers to fix certain costs and revenue over a period of time, thus determining expenses paid or revenues generated in advance. In addition, the trade and exchange of derivatives through an electronic marketplace may enable both the buyer and seller to exchange or sell the contracts to others between the time of the execution of the contract and the time that possession of the product or service is to be delivered.

In an embodiment of the present invention, entities desiring to purchase derivatives, such as future contracts, put options, and call options, are matched with entities desiring to sell derivatives in a marketplace configured to trade those derivatives. In one embodiment, the marketplace may be a virtual marketplace run on a computing system and accessible via remote computer systems coupled by various means including the internet.

Futures are standardized contracts that set a fixed price for goods or services at a particular time in the future and can be marketed and sold to third parties. The entity that holds the future as of the execution date may be obligated to perform on the contract and take acceptance of the goods or services that are the subject of the future.

In an exemplary usage of the present invention, a prospective purchaser may want to protect against the possibility of rising prices of a certain type of good or service. In a similar manner, a supplier may wish to protect against the possibility of falling prices. Therefore, the purchaser and the supplier can enter into an agreement for the purchase of a ticket for a set price at some point in the future. The trade can then be cleared.

Figure 1:
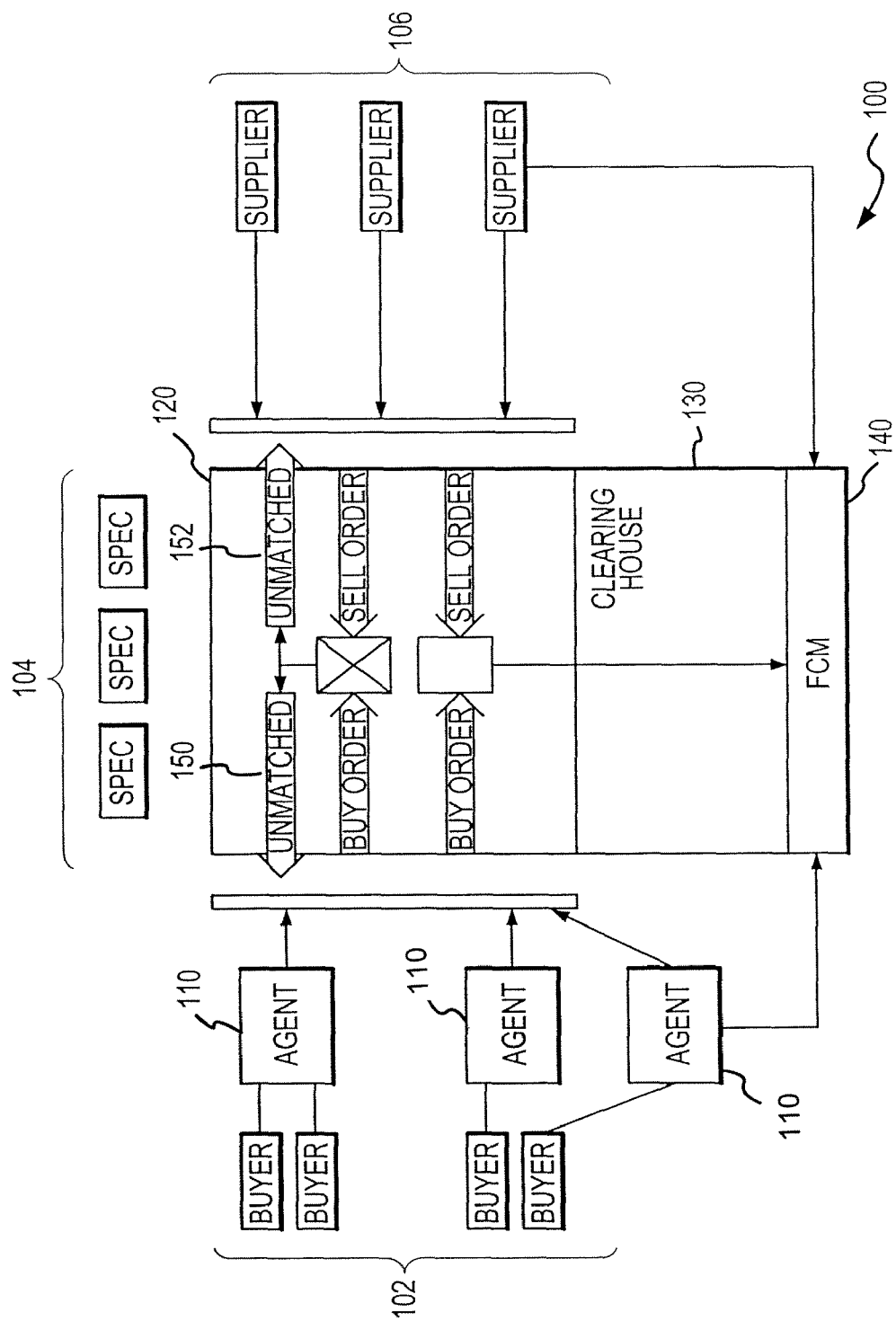
FIG. 1 illustrates a block diagram overview of an embodiment of the present invention.

With reference to FIG. 1, a block diagram illustrating a computer-implemented marketplace for futures is presented. While FIG. 1 may be described in terms of a marketplace for the exchange of goods and services related to travel, it should be understood that embodiments of the present invention are not limited to travel products and may encompass a great variety of different goods and services.

Marketplace 100 comprises a travel exchange 120, a clearinghouse 130, and a futures commission merchant ("FCM") 140. Travel exchange 120 is configured to store and list all available offers to sell and offers to buy. Travel exchange 120 may also be configured to automatically match offers to sell with offers to buy, if the offers are similar. Clearinghouse 130 may be configured to credit and debit accounts involved in a particular transaction. FCM 140 may be configured to provide a variety of different administrative functions, described in more detail below.

Various entities may use marketplace 100. For example, buyers 102 may wish to place an offer to buy on travel exchange 120. One of suppliers 106 may view various offers to buy that are placed on travel exchange 120 and offer to fulfill the buy order. In addition, the placing of the order on exchange 120 may occur through the use of an intermediary, such as an agent 110, 112, or 114. In a similar manner, suppliers 106 can place offers to sell on travel exchange 120. In that situation, travel exchange 120 would match offers to buy with similar offers to sell. In the alternative, travel exchange 120 may be configured such that various entities, such as buyer 102 and agent 110, can view the various offers to sell on the travel exchange and make an offer to buy on the offers to sell.

Figure 4:
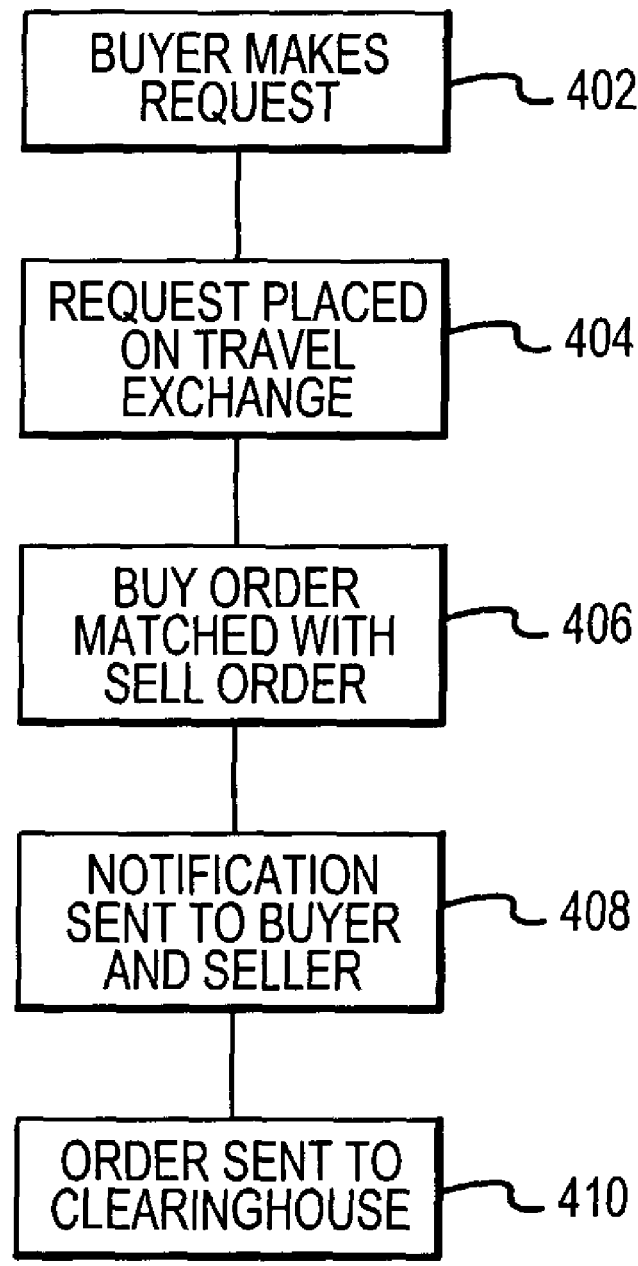
FIG. 4 is a flow chart illustrating the process of an embodiment of the present invention.

With reference to FIG. 4, a flow chart illustrating the operation of an exemplary embodiment of the present invention is presented. A buyer 102 submits a travel request or offer to buy for future time periods (step 402). Various intermediaries, such as agent 110 may act as agents to the various entities 102 and submit the request on behalf of a buyer 102. One or more of agents 110 may advise buyer 102 as to the formulation of a purchasing strategy based on the past travel history of buyer 102. After receiving an order, agent 110, for example, can place the order on travel exchange 120 (step 404).

Travel exchange 120 may be configured to match orders, i.e., reconcile offers to sell and offers to buy for various items such that offers to sell and offers to buy for similar orders are grouped together (step 406). The criteria used to match bids and asks may be similar to the criteria described in U.S. patent application Ser. No. 09/827,031, filed Apr. 5, 2001 (hereinafter "the '031 application"). Various suppliers 106 may be able to view various offers to buy on travel exchange 120. When a supplier views an offer to buy it wishes to fulfill, it may place a request to sell on travel exchange 120. Thereafter, the matching process can be undertaken. In the alternative, supplier 120 may place an offer to sell on travel exchange 120, and various offers to buy placed on the exchange can be matched with an offer to sell.

Once a match between a request to buy and a request to sell is found, travel exchange 120 may be configured to send a notification to both the supplier and the purchaser of the matched items such that the supplier and purchaser can decide if a transaction is desired (step 408).

Once a request to buy is matched with a request to sell, the request is sent to clearinghouse 130 (step 410). Clearinghouse 130 may be configured to mark the contracts and to credit or debit any accounts involved in the transaction. Clearinghouse 130 may also serve to guarantee the contract and take the credit risk. Thus, clearinghouse 130 may act as a financial intermediary between the buyers and the suppliers by acting as a counter-party to both parties. Upon exercise of the future, if there is to be a delivery, clearinghouse 130 buys the products from the supplier and sells it to buyer 102, possibly through agent 110. If no delivery is desired, clearinghouse 130 may be configured to cash each party out. Clearinghouse 130 may be computer-implemented such that the above-described operations are automatically performed at predetermined times.

Futures Commission Merchant ("FCM") 140 may serve several purposes in an embodiment of this invention. For example, FCM 140 can hold funds of the various parties in various accounts, including margin accounts for credit purchases. In addition, FCM 140 may serve to perform various administrative functions, such as the maintenance of various records maintained in the buying and selling of the futures. FCM 140 may be computer-implemented such that the above-described operations are automatically performed at predetermined times.

Speculators 104 may also be present in an embodiment of the present invention. Speculators may search exchange 120 to find unmatched orders (both offers to buy and offers to sell) that it wishes to take a position on. In such a manner, speculators 104 may attempt to benefit from fluctuations in the travel market without necessarily having any travel needs of its own, in a similar manner that one may use a stock market for investment purposes. Speculators 104 may purchase an unmatched offer to sell (e.g., an airline ticket) and attempt to market the item for sale to prospective buyers. In addition, speculators 104 may also purchase an offer to buy and attempt to market the item to prospective suppliers.

There may also be unmatched orders 150 and 152 present within exchange 120. Unmatched order 150 may occur if there is a buyer willing to purchase a future for a particular product or service and places an offer to buy on exchange 120, but no supplier can be matched with a particular travel request. Unmatched order 152 may occur if a supplier is willing to issue a future for a product or service, but no matching buyer exists. Unmatched orders 150 and 152 may remain on exchange 120 for a predetermined time period. If orders 150 and 152 remain unmatched after the expiration of the predetermined time period, the orders may expire. The entities that placed the unmatched order may be able to re-submit the orders to exchange 120 should such a situation occurs.

It should be understood that the matching process may be configured with a predetermined amount of deviation allowed from the requested product or service, as described, for example, in the '031 application. For example, a bid (offer to purchase) for travel from Los Angeles to Chicago at 9:00 am on a certain day may be matched with an ask (offer to supply) for travel from Los Angeles to Chicago at 8:00 am on that day.

With reference to FIG. 1, in an exemplary usage of the present invention, upon the completion of the transaction, one buyer of buyers 102 may own the right to purchase ten seats at $800 each while the supplier may own the right to sell ten seats at $800 each. Until the expiration of the future, either party may be able to sell their position to a third party. Exchange 120 can be configured to match orders and find counter-parties. At the expiration of the future, clearinghouse 130 may perform several tasks, including settling the trade, paying the supplying party, and delivering the tickets to the purchasing party. Exchange 120 may also be configured to match orders and find counter-parties. At the expiration of the future, clearinghouse 130 settles the trade, pays the supplying party and delivers the goods or tickets to the purchasing party.

An option may be viewed as being similar to a future, as it is the right to purchase particular goods or services at a certain price in the future. One possible difference between an option and a future is that the execution of an option by the buyer may not be mandatory. For a future, the contract can be traded from one party to another. When the time comes to fulfill the contract, the owners of the contract at the expiration date must meet the terms: the supplier provides the requested goods or services; and the buyer takes delivery of the requested goods or services. With an option, the buyer may not be required to exercise the option. If the buyer decides not to exercise the option, the option expires. The buyer may chose to allow an option to expire for various reasons. For example, the buyer may be able to receive a more favorable price through the free market than by exercising the option. If options expire (i.e., the options are not exercised), neither party may be obligated to meet the terms of the contract.

An exemplary situation involving the use of options with respect to the travel industry is as follows. A buyer may have several employees regularly traveling between Los Angeles, Calif. and Chicago, Ill. The price in the market that the corporation can transact today is, e.g., $1,000. The buyer forecasts that it will have a certain number of people traveling this route six months in the future. To hedge against a potential increase in the price, the buyer may purchase the right to buy tickets six months in the future at the current price (or another negotiated price). The buyer may be charged a premium of, for example, $50, to purchase the option. The buyer has thus locked in its maximum expected expenditure on tickets six months in advance.

Upon the expiration of the option in six months, the buyer has several alternatives to choose from. The buyer may choose to exercise its option and take inventory of the product (i.e., actually buy the ticket from the supplier). For example, if the fair market value of the ticket has increased to $1200, the buyer would save $150 per ticket ($1200 minus the $1000 option execution price minus the $50 option price) by exercising the option and purchasing the ticket for $1000. In the alternative, the buyer may allow the option to expire. For example, if the fair market value of the tickets has lowered to $800 per ticket, the buyer may not want to buy the tickets at $1,000, the option execution price, because the tickets could be purchased at a fair market price of $800.

Another alternative for the buyer would be to participate in the speculative market after the purchase of the option, before the execution date of the option. The speculative market may provide a means for participants to speculate on, and profit from, fluctuations in travel prices. If the fair market value of the tickets has increased, the buyer may be able to sell the options for a profit, as other entities may wish to purchase the option at a higher price than that paid by the buyer to take advantage of the lower price of the reservations through the use of the options. The buyer may wish to participate in the speculative market for a variety of reasons. For example, the buyer's travel needs may have changed and the buyer may no longer need the number of options it originally purchased.

There are two major types of options, put options and call options, and they are used by different parties to meet their respective needs. A put option is the right to sell goods at a specific price in the future. A supplier may wish to buy a put option in order to hedge against falling prices. A call option is the right to buy goods at a specific price in the future. A buyer may wish to buy a call option in order to hedge against rising ticket prices.

Figure 2:
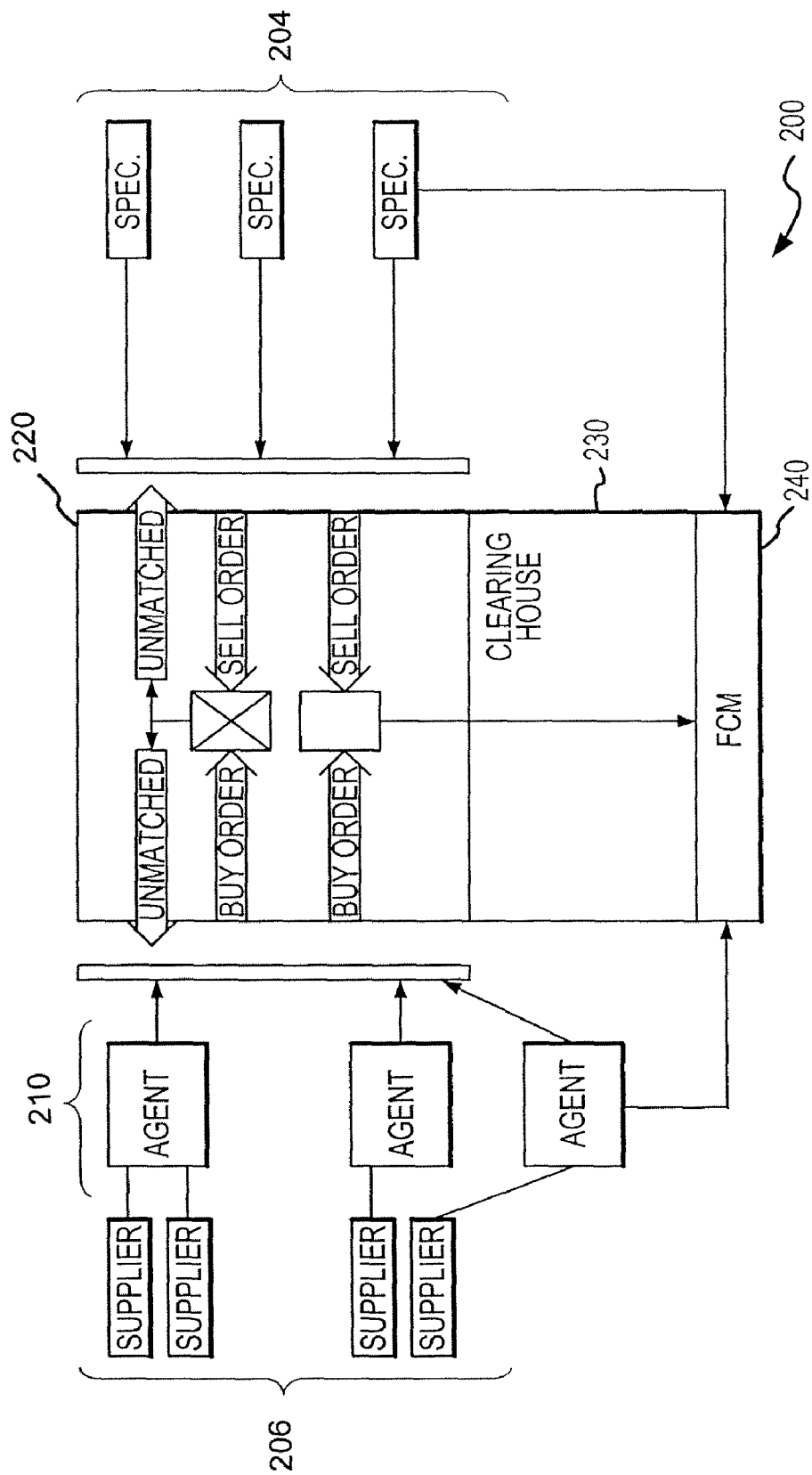
FIG. 2 illustrates a block diagram overview of another embodiment of the present invention.

With reference to FIG. 2, a block diagram overview illustrating a computer-implemented marketplace for put options is presented. Marketplace 200 comprises an options exchange 220, a clearinghouse 230, and a futures commission merchant ("FCM") 240. Options exchange 220 lists all available offers to sell and offers to buy, if the offers are similar. Clearinghouse 230 may be configured to credit and debit accounts of the parties involved in a particular transaction. FCM 240 may be configured to provide a variety of different administrative functions, described in more detail supra.

The process for using put options is similar to the process described above with respect to futures. In a hypothetical situation involving airline travel, one of the various suppliers (202) may wish to buy a put option as a hedge against falling ticket prices. An airline may wish to, for example, sell one cross-country flight six months in the future for $800. A speculator (210) may wish to profit from the premium charged for the option (e.g., approximately 5% of the ticket price) and speculator 210 absorbs the price risk (i.e., the risk that the price will rise) in return. The speculator writes a put option with the above characteristics. The put option is then placed on options exchange 220, where various entities can view the available options and place bids on desired options. In one embodiment, several potential buyers may be able to bid on the same option. The winning bidder can be determined by a number of different methods (such as determining the highest bidder). In another embodiment, an option can be removed from the market as soon as a bidder appears. The resulting situation is that the airline owns the right to sell one futures contract. The speculator may be obliged to buy one futures contract if the option is exercised, regardless of the identity of the holder of the option. Until the expiration of the option, either party can trade their position and the option can then be traded on options exchange 220. At the expiration of the option, the clearinghouse settles the trade and delivers the underlying futures contract by netting out the various positions.

Figure 3:
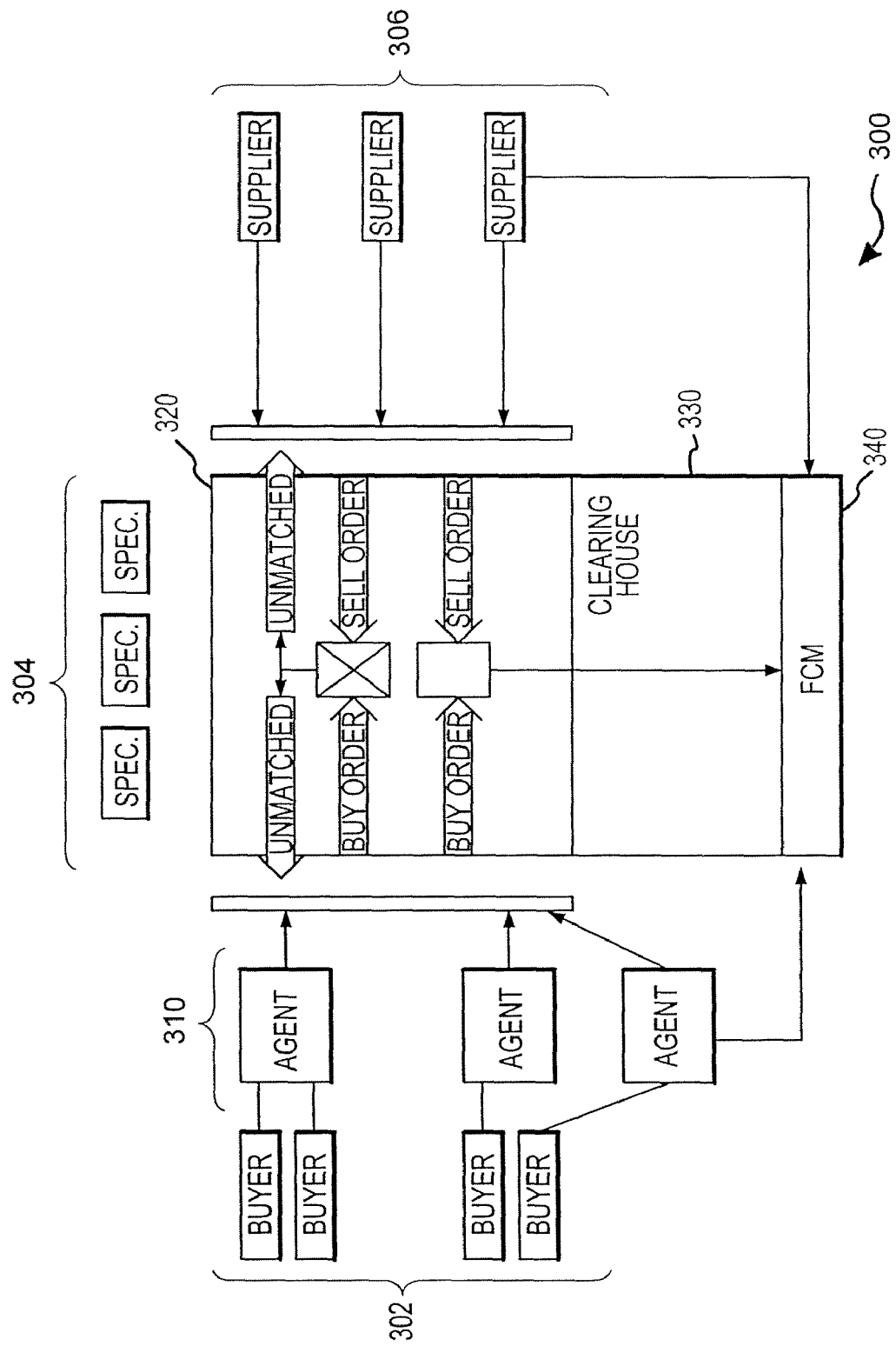
FIG. 3 illustrates a block diagram overview of another embodiment of the present invention.

With reference to FIG. 3, a block diagram overview illustrating a marketplace for call options is presented. Marketplace 300 comprises a travel exchange 320, a clearinghouse 330, and a futures commission merchant ("FCM") 340. Travel exchange 320 lists all available offers to sell and offers to buy. Travel exchange 320 may also be configured to automatically match offers to sell with offers to buy, if the offers are similar. Clearinghouse 330 may be configured to credit and debit accounts involved in a particular transaction. FCM 340 may be configured to provide a variety of different administrative functions, described in more detail supra.

The process for using call options is similar to the process described above. A buyer 302 may wish to buy, for example, an $800 cross-country flight six-months in the future. By making the purchase in advance, buyer 302 may wish to hedge against a possible rise in ticket prices. A speculator 304 may wish to profit from the premium charged (e.g., approximately 5% of the ticket price) and absorbs the price risk in return. Speculator 304 thus writes a call option with the above criteria. The call option is then placed on the options exchange 320, where various entities, including suppliers 306, can view the available options and make bids on the desired options. Options exchange 320 may be configured to keep a portion of the premium that is paid to the writer of the call option. The resulting position is that speculator 304 owns the right to buy one futures contract. Speculator 304 is obliged to sell one futures contract if the option is exercised. Until the expiration of the call option, either party can trade their position away and the option can then be traded on the exchange. At the expiration of the option, the clearinghouse settles the trade, delivers the underlying futures contract by netting out positions.

This system improves upon the prior art in several different ways. For example, in the past, it has been relatively difficult for individuals and small to medium-sized corporations to negotiate discount travel pricing in the same manner as large corporations. Negotiation of contracts is a time and cost-intensive process. As a result, suppliers typically do not go to the expense of negotiating with middle and small market companies. In addition, small and middle market buyers do not have enough leverage to achieve discounted rates, as such leverage is typically gained through high volume. By enabling the negotiating and trading of contracts through an electronic marketplace and by enabling speculators to aggregate contracts, an efficient means of meeting supplier and demand is established. By allowing the forecasting of future demand, because contracts establish a fixed cost in the future, the present invention provides a means for small to medium-sized corporations to communicate their needs and negotiate the prices of products with suppliers. In a similar manner, suppliers may wish to use derivatives in order to stabilize their future sales. Suppliers can utilize the marketplace as a tool to guarantee a certain amount of future revenues through futures and gain revenue during downturns by accepting premiums for options contracts.

In addition, the above-described system facilitates the ability to smooth out price fluctuations of various goods and services. For example, the corporate travel market may become at the mercy of the economy. When the economy is good, demand in the travel market is typically up and ticket prices adjust accordingly. When the economy is sluggish, companies cut back on travel and demand in the travel market is typically reduced. Prices fluctuate depending on a multitude of reasons ranging from the cost of fuel to the time of year to the weather. Embodiments of the present invention help both buyers and suppliers hedge against uncertainties in the market: buyers will be able to anticipate their travel needs and guarantee prices and suppliers will be able to guarantee revenue in advance and have a tool to manage their inventory. In addition, the ability of small and medium sized business to participate in the market will result in fairer pricing for all businesses.

While certain embodiments of the present invention were described with respect to airline travel, it should be understood that the present invention may be modified and used with numerous other types of goods and services.

The present invention may be operated using a system which may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases. As those skilled in the art will appreciate, a user computer will typically include an operating system (e.g., Windows NT/95/98/2000/ME/XP, Linux, Solaris, UNIX, etc.) as well as various conventional support software and drivers typically associated with computers. A user computer can be in a home or business environment with access to a network. In an exemplary embodiment, access is through the Internet through a commercially-available web-browser software package.

Communication between the parties to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Information may be stored in embodiments of the present invention using a database. The database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or various other database products. Databases may be organized in any suitable manner, including as data tables or lookup tables. Association of certain data may be accomplished through any data association technique known and practiced in the art. For example, the data association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The computer may provide a suitable website or other Internet-based interface which may be accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "website" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), PHP hypertext processor, helper applications, plug-ins, and the like.

The present invention may be described herein in terms of functional block components, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with various algorithms being implemented with any combination of data structures, objects, processes, routines or other programming elements. Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical".

We claim:

1. A system for trading travel item derivatives comprising:
a network interface communicating with a non-transitory memory;
the memory communicating with a processor for trading the travel item derivatives; and
the processor, when executing a computer program, is configured to:
receive, by the processor, offers to purchase the travel item derivatives and offers to sell the travel item derivatives from users;
store and list, by the processor, the received offers to purchase and the offers to sell the travel item derivatives, such that the users may view the offers;
match, by the processor and based upon predetermined criteria, a first user's offer to purchase the travel item derivative with a second user's offer to sell the travel item derivative, wherein a first predetermined criterion is based on at least one of arrival time, departure time, arrival date, departure date, arrival city, and departure city, wherein the predetermined criteria comprises the first predetermined criterion, and wherein the match, by the processor, comprises matching based upon a predetermined amount of deviation in the at least one of arrival time, departure time, arrival date, departure date, arrival city, and departure city;

notify, by the processor, the first user and the second user of the matched offers to determine if a transaction is desired for the implicated travel item derivative;

process, by the processor, monetary accounts of the first user and the second user to facilitate a desired transaction; and aid, by the processor and in response to the travel item derivative being exercised, the first user and the second user in settling their underlying obligations of the travel item derivative, wherein the travel item derivative comprises at least one of a futures contract, a put option, and a call option, and wherein the first predetermined criterion allows for a predetermined amount of deviation in the at least one of arrival time, departure time, arrival date, departure date, arrival city, and departure city.

2. The system of claim 1, wherein the processor is further configured to delete an offer to purchase or an offer to sell if the respective offer remains unmatched after a predetermined time period.

3. The system of claim 1, wherein the travel item derivative is a futures contract for an airline ticket and the second user is a supplier of airline tickets, and wherein the aid in settling the underlying obligations comprises purchasing the airline ticket from the second user and delivering the airline ticket to the first user.

4. A computer-based method of trading derivatives comprising:

creating, by a computer-hosted exchange for trading the derivatives, the derivatives of travel items available for trading on the computer-hosted exchange;

creating, by the computer-hosted exchange, requests to purchase derivatives of travel items available on the computer-hosted exchange;

matching, by the computer-hosted exchange, an available request to an available derivative if a travel item underlying the request and a travel item underlying the derivative are similar according to predetermined criteria;

generating, by the computer-hosted exchange, an order to purchase the matched derivative;

sending, by the computer-hosted exchange the order to a computer-hosted clearinghouse; and deleting, by the computer-hosted exchange, unmatched requests and unmatched derivatives from the computer-hosted exchange, wherein at least one of the predetermined criteria is based on at least one of arrival time, departure time, arrival date, departure date, arrival city, and departure city, wherein derivatives made available for trading on the computer-hosted exchange comprise at least one of futures contracts, put options, and call options, and wherein at least one of the predetermined criteria allows for a predetermined amount of deviation in the at least one of arrival time, departure time, arrival date, departure date, arrival city, and departure city.

5. The method of claim 4, wherein airplane tickets are the travel items underlying the available derivatives and the available requests.

6. The method of claim 4, wherein the order is cleared at the clearinghouse.

7. A system for trading derivatives comprising:

a network interface communicating with a non-transitory memory;

the memory communicating with a processor for trading derivatives; and the processor, when executing a computer program, is configured to:

create, by the processor, the derivatives of travel items available for trading;

create, by the processor, requests to purchase derivatives of travel items available on the exchange;

match, by the processor, an available request to an available derivative, if a travel item underlying the request and a travel item underlying the derivative are similar according to predetermined criteria;

generate, by the processor, an order to purchase the matched derivative;

send, by the processor, the order to a computer-hosted clearinghouse; and delete, by the processor, unmatched requests and unmatched derivatives, wherein at least one of the predetermined criteria is based on arrival time, departure time, arrival date, departure date, arrival city, and departure city, wherein the derivatives made available for trading comprise at least one of futures contracts, put options, and call options, and wherein the at least one of the predetermined criteria allows for a predetermined amount of deviation in the at least one of arrival time, departure time, arrival date, departure date, arrival city, and departure city.

8. The system of claim 7, wherein airplane tickets are the travel items underlying the available derivatives and the available requests.

* * * * *